US007881991B2

(12) United States Patent
Darrell (10) Patent No.: US 7,881,991 B2
(45) Date of Patent: Feb. 1, 2011

(54) RECEIPT PRESENTMENT SYSTEMS AND METHODS

(75) Inventor: Richard A. Darrell, Omaha, NE (US)

(73) Assignee: First Data Corporation, Greenwood Village, CO (US)

( * ) Notice: Subject to any disclaimer, the term of this patent is extended or adjusted under 35 U.S.C. 154(b) by 881 days.

(21) Appl. No.: 10/615,582

(22) Filed: Jul. 7, 2003

(65) Prior Publication Data

US 2005/0010505 A1  Jan. 13, 2005

(51) Int. Cl.
*G06Q 40/00* (2006.01)
(52) U.S. Cl. .............................. 705/35; 705/26; 705/38; 705/39; 705/40
(58) Field of Classification Search .............. 705/16–40
See application file for complete search history.

(56) References Cited

U.S. PATENT DOCUMENTS

| 5,559,313 | A | * | 9/1996 | Claus et al. ................... 705/30 |
| 5,832,458 | A | | 11/1998 | Jones |
| 5,963,925 | A | * | 10/1999 | Kolling et al. ................. 705/40 |
| 6,128,603 | A | | 10/2000 | Dent et al. |
| 6,282,552 | B1 | * | 8/2001 | Thompson et al. ........... 715/505 |
| 6,343,279 | B1 | | 1/2002 | Bissonette et al. |
| 6,385,595 | B1 | * | 5/2002 | Kolling et al. ................. 705/40 |
| 6,397,194 | B1 | * | 5/2002 | Houvener et al. ............. 705/16 |
| 6,606,740 | B1 | | 8/2003 | Lynn et al. |
| 6,622,126 | B1 | * | 9/2003 | McArdle et al. .............. 705/26 |
| 6,970,881 | B1 | * | 11/2005 | Mohan et al. ............... 707/102 |
| 7,152,207 | B1 | * | 12/2006 | Underwood et al. ........ 715/526 |
| 7,154,998 | B2 | * | 12/2006 | Clark et al. .................. 379/116 |
| 7,386,478 | B2 | * | 6/2008 | Viswanath .................... 705/26 |
| 7,712,028 | B2 | * | 5/2010 | Kuruoglu et al. ............ 715/254 |
| 7,746,510 | B2 | * | 6/2010 | Pandipati .................... 358/474 |
| 2001/0029470 | A1 | * | 10/2001 | Schultz et al. ................ 705/26 |
| 2002/0032612 | A1 | * | 3/2002 | Williams et al. .............. 705/26 |
| 2002/0152001 | A1 | * | 10/2002 | Knipp et al. ................ 700/100 |
| 2002/0184123 | A1 | | 12/2002 | Sijacic et al. |
| 2003/0074269 | A1 | * | 4/2003 | Viswanath .................... 705/26 |
| 2003/0149572 | A1 | * | 8/2003 | Newton et al. ................. 705/1 |
| 2004/0078282 | A1 | * | 4/2004 | Robinson ..................... 705/26 |
| 2005/0010505 | A1 | * | 1/2005 | Darrell ........................ 705/35 |
| 2008/0141117 | A1 | * | 6/2008 | King et al. ................... 715/238 |

(Continued)

FOREIGN PATENT DOCUMENTS

WO   WO 02/01523 A1   1/2002

OTHER PUBLICATIONS

Waldmeir, Patti E-Business: Credit Card Arbitration Fill Cross-Border Legal Vacuum;Financial Times, Mar. 9, 2000; London.

(Continued)

*Primary Examiner*—Narayanswamy Subramanian
(74) *Attorney, Agent, or Firm*—Townsend and Townsend and Crew LLP (57) ABSTRACT

A method of presenting an image of a receipt to a consumer includes electronically capturing a receipt and storing the receipt at a host computer system. The method further includes receiving a request at the host computer system from a computer of the consumer to display the image of the receipt and transmitting an electronic file comprising the image of the receipt for display at the customer computer.

16 Claims, 4 Drawing Sheets

U.S. PATENT DOCUMENTS

2008/0294976 A1* 11/2008 Rosenberg .................. 715/209

OTHER PUBLICATIONS

"Global Payments Expands and Enhances Integrated Payment Information Management Tool" Jul. 9, 2001, [online] PR Newswire, The Gale Group [retrieved on Dec. 1, 2003] retrieved from <Dialog No. 08783193>.

"National Bank of Canada and Global Payments Form Alliance" Jul. 11, 2001, [online] The Gale Group [retrieved on Dec. 1, 2003] retrieved from <Dialog No. 08793393>.

"Global Payments Expands and Enhances Integrated Payment Information Management Tool" Jul. 11, 2001, [online] Card News, v. 16, n. 13; [retrieved on Dec. 1, 2003] retrieved from <Dialog No. 08793384>.

"First Data Acquires Internet Payment Company Achex" Jul. 11, 2001, [online] Card News, v. 16, n. 13; [retrieved Dec. 1, 2003] retrieved from <Dialog No. 08793383>.

"Verify Me: Authentication Challenges Move Front and Center" Jul. 11, 2001, [online] Card News, v. 16, n. 13; [retrieved Dec. 1, 2003] retrieved from <Dialog No. 08793381>.

"Global Access Advantage" Oct. 30, 2001, [online], Global Payments Inc. [retrieved on Aug. 18, 2003], retrieved from the Internet: <URL: www.archive.org/web/20011030151119/http://globalpaymentsinc.com/ProductsAndServices/GlobalAccess.html>.

"National Data Subsidiary, Global Payment Systems Announces Alternative Payment Solution Accessible Through Touch Tone Telephones" Oct. 7, 1997 PR Newswire p1007ATTU004 [online] [retrieved on Dec. 1, 2003] retrieved from <Dialog No. 05276422>.

"ECHO Announces MerchantAmerrica.com the Nation's First E-Commerce, Financial and Business Service Portal Dedicated Just to Merchants"; Mar. 28, 2001; [retrieved on Dec. 1, 2003] retrieved from <Dialog No. 08465209>.

Electronic Clearing House, Inc. Form 10-Q, May 9, 2002 [online]; [retrieved on Aug. 18, 2003] retrieved from the Internet: <URL: www.secfilingsnasdaq.com/edgar_conv_html/2002/05/09/0001015402-02-001584.html>.

Electronic Clearing House, Inc. Form 10-K, Dec. 26, 2001 [online]; [retrieved on Aug. 18, 2003] retrieved from the Internet: <URL: www.hoovers.com/free/co/secdoc.xhtml?ipage=1562747&doc=1>.

Merlin Solutions, Inc. website Nov. 30, 2001 [online]; [retrieved on Aug. 19, 2003] retrieved from the Internet: <URL: www.archive.org/web/20011130121721/http://merlinsolutions.com>.

"Transpoint Continues to Move Forward with E-Billing Plans", Aug. 31, 2000 [online]; [retrieved on Dec. 1, 2003] retrieved from <Dialog No. 07774607>.

"Boss George" by John R. Engen, Institutional Investor, pp. 40-47, Jul. 2001.

Fifth Third Bank web site Oct. 6, 2001 [online]; [retrieved on Aug. 19, 2003] retrieved from the Internet: <URL: www.archive.org/web/20011006021759/http://53.com/corporate/merchant/mivison.asp>.

"Kinko's Inc. Enhances its Back-Office Management Capabilities Via Fifth Third Bank's Merchant Services Technology" Nov. 13, 2000 PR Newswire, p. 6866; [online] [retrieved on Dec. 1, 2003] retrieved from <Dialog No. 08037585>.

"In Brief: Midwest to Process for Fazoli's Eateries" Sep. 20, 2000 American Banker, v.165, n.181, p. 18; [online] [retrieved on Dec. 1, 2003] retrieved from <Dialog No. 07824710>.

"Midwest Payment to Process Nordstrom's Credit Card Transactions" Aug. 23, 2000 Cardfax v2000, n162, p. 2 [online]; [retrieved on Dec. 1, 2003] retrieved from <Dialog No. 07793346>.

"Barnes & Noble Chooses Fifth Third Bank for Credit Card Services" Nov. 23, 1999 PR Newswire, p. 1715 [online] [retrieved on Dec. 1, 2003] retrieved from <Dialog No. 06826944>.

"With Halloween Just Around the Corner, Rumpus Puts the 'Eeel' into E-Cards at www.Rumpustoys.com" Oct. 18, 1999 PR Newswire p. 1321 [online] [retrireved on Dec. 1, 2003] retrieved from <Dialog No. 06727540>.

"Card Briefs: OshKosh B'Gosh Awards Processing to Fifth Third (Brief Article)" May 3, 1999 American Banker, v164, n83, p. 15(1) [online] [retrieved on Dec. 1, 2003] retrieved from <Dialog No. 06314724>.

"Who's Using Whom" Sep. 1998 Chain Store Age [online] [retrieved on Aug. 19, 2003] retrieved from <www.chainstorageage.com>.

"BancTec Cuts Exclusive Ties with Document Solutions Inc." Aug. 20, 1997 Document Imaging Report v7, n17, p. 4(1) [online] [retrieved on Dec. 1, 2003] retrieved from <Dialog No. 09761254>.

Trintech website Jan. 24, 2002 [online]; [retrieved on Aug. 19, 2003] retrieved from the Internet <URL: www.archive.org/web/20011213223356/http://www.trintech.com/index.cgi>.

Visa DPS website Jan. 19, 2002 [online]; [retrieved on Aug. 19, 2003] retrieved from the Internet: <URL: www.archive.org/web/20011216220050/http://www.visadps.com/nav_top.html>.

* cited by examiner

Food ← 352

| Date | Merchant | Amount |
|------|----------|--------|
| ~~~~ | ~~~~~~~~~~~ | $~~.~~ |
| ~~~~ | ~~~~~~~~~~~ | $~~.~~ |
| ~~~~ | ~~~~~~~~~~~ | $~~.~~ |

↖ 354    ↑ 356    ↑ 358

Clothing

| Date | Merchant | Amount |
|------|----------|--------|
| ~~~~ | ~~~~~~~~~~~ | $~~.~~ |
| ~~~~ | ~~~~~~~~~~~ | $~~.~~ |
| ~~~~ | ~~~~~~~~~~~ | $~~.~~ |

Item: ~~~~~~~~~~~~~~~~~~ ← 362

Description: ~~~~~~~~~~~~~~~~~~~~~~~~~ ← 364
~~~~~~~~~~~~~~~~~~~~~~~~~~~~~~~~~~
~~~~~~~~~~~~~~~~~~~~~~~~~~~~~~~~~~
~~~~~~~~~~~~~~~~~~~~~~~~~~~~~~~~~~
~~~~~~~~~~~~~~~~~~~~~~~~~~~~~~~~~~

RECEIPT PRESENTMENT SYSTEMS AND METHODS

CROSS-REFERENCES TO RELATED APPLICATIONS

This application is related to co-pending, commonly assigned U.S. patent application Ser. No. 10/180,251, entitled, "FINANCIAL STATEMENT PRESENTMENT SYSTEMS AND METHODS" filed on Jun. 25, 2002, by William Hickox, et al., the entire disclosure of which is herein incorporated by reference.

BACKGROUND OF THE INVENTION

This invention relates generally to the field of financial transactions, and in particular to financial transactions wherein one or more electronic records of the transaction are produced. More specifically, the invention relates to systems and methods for electronically displaying transaction receipt information to consumers or others.

Every day millions of financial transactions occur throughout the world. In most cases, electronic records of the transactions are created. For example, one common type of financial transaction involves the use of a presentation instrument, such as a credit card, a debit card, and the like. When such a presentation instrument is used to make a purchase, information stored on the card is often read by a point of sale device which creates an electronic record of the purchase. In the case of credit cards, the information read by the point of sale device along with the amount of the purchase may be routed through various other entities in order to complete the purchase. For example, the transaction information may be electronically sent to the merchant's bank or financial institution, to a card hold association, such as VISA or MasterCard, and/or to the issuer's bank or financial institution. Each of these entities may also store information regarding the transaction.

Periodically, the credit card users (herein consumers) must be billed for their usage of their credit accounts. In some cases, the consumers wish to review a receipt relating to a charge on their statement. Present systems, however, do not provide ways for consumers to quickly receive electronic receipt images. Thus, improved systems and methods are needed that allow consumers to electronically view detailed information relating to their accounts.

BRIEF SUMMARY OF THE INVENTION

Embodiments of the present invention thus provide a method of presenting an image of a receipt to a consumer. The method includes electronically capturing a receipt and storing the receipt at a host computer system. The method further includes receiving a request at the host computer system from a computer of the consumer to display the image of the receipt and transmitting an electronic file comprising the image of the receipt for display at the customer computer. In some embodiments, the receipt may be a credit card receipt. The receipt may include an image of the consumer's signature. The receipt may be printed on paper at a point of sale, in which case electronically capturing may include scanning an image of the receipt to an electronic file. Electronically capturing may include receiving a file from a point-of-sale device, in which case the file may include an image of the customer's signature. The file may include programming that causes at least one credit card receipt item to appear as a selectable link to more detailed information about the item. The method may include receiving a selection of the item from the customer and consulting a database for information about the item. The method also may include transmitting a file comprising the information to the customer. In some embodiments the method includes receiving a request at the host computer from the consumer computer to display a categorical listing of items purchased by the consumer. The items may be from a plurality of receipts. For each of the plurality of receipts, the method also may include consulting a database for information relating to each item of the receipt, using the information to sort the items into categories, and transmitting an electronic file from the host computer system to the consumer computer. The file may include a listing of the items sorted into at least one category for display at the consumer computer. In such cases, the file may include programming that causes at least one item to appear as a selectable link to more detailed information about the item. The method also may include receiving information from the consumer computer that defines the at least one category.

In other embodiments, a system for presenting an image of a receipt to a consumer includes a host computer system and an interface through which the host computer system communicates with at least one consumer computer. The host computer system may be programmed to receive an electronically-captured receipt, store the receipt, receive a request from a computer of the consumer to display the image of the receipt, and transmit an electronic file comprising the image of the receipt for display at the customer computer. The receipt may be a credit card receipt. The host computer system also may include an image capture device configured to electronically capture receipt images. The image capture device may be further configured to convert image information captured from a receipt into data, in which case the data may appear in an electronic image of the receipt as a selectable link relating to the data. The interface may be configured to provide communication between the host computer system and at least one point-of-sale device. The system may include a product information database for storing product information that is retrievable via an identifier relating to an item. The identifier may be a UPC or SKU.

In still other embodiments, a system for presenting an image of a receipt to a consumer includes means for receiving an electronic image of a receipt, means for storing the image, means for receiving a request from a computer relating to the consumer to display the image, and means for transmitting the image to the consumer computer. The system also may include means for obtaining product information relating to an item on the receipt. The system also may include means for categorizing a plurality of items on a receipt according to the product information.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components.

DETAILED DESCRIPTION OF THE INVENTION

Credit services may be established with essentially any type of person, entity, organization, business, or the like that wishes to take payments for goods or services in the form of a credit, and, for convenience of discussion, are generally referred to herein as "merchants". Such merchants may process a credit transaction based on an account identifier presented at the time of payment. The account identifier is used to identify the account to which the credit will eventually be posted. In many cases, the account identifier is provided on some type of presentation instrument, such as a credit card, debit card, smart card, stored value card, or the like. Conveniently, the account identifier may be read from a point of sale device, which also may capture an electronic image of a consumer's signature.

The user account information is transmitted to a credit processing service that approves and processes the transaction information and provides payment to the merchant. The credit processing service includes at least one platform server that receives and processes the transaction information. One example of a credit processing service is the service provided by First Data Corporation, Englewood, Colo.

The credit processing organization may provide credit processing services on behalf of many clients, such as banks, or other financial institutions, and the like, who wish to issue credit accounts to their customers. The customers may then use the accounts to transact with merchants.

Periodically, the credit processing organization produces financial statements that summarize transactions for customers and bill the customers at least a minimum amount based upon their usage of the credit account. The financial statements must be presented to the customer so that the customer may render payment. The financial statements may be presented in paper form or as an electronic document, for example.

Consumers occasionally desire more detailed information regarding their purchases. For example, some consumers may not recall a purchase and/or may not be able to locate a receipt. According to embodiments of the present invention, a consumer viewing an electronic statement may select a charge for closer inspection. By selecting the charge, which may be a hyperlink, the consumer is able to view an image of their credit card receipt and/or print a copy of the receipt for merchandise returns, rebates, tax preparation, and/or the like.

The credit card receipt may be provided by the processor to the consumer in a number of ways. In one example, at the end of each business day (or other time period), merchants may send receipts to the processor (or a third party) for scanning. In another example, a point-of-sale device at the merchant's location actually scans a paper receipt signed by the consumer and forwards the resulting electronic image to the processor. In such cases, the merchant may keep the signed receipt and print a copy of the signed receipt for the consumer. In another example, the point-of-sale device may comprise a signature capture pad that receives an electronic image of the consumer's signature as he signs either a paper receipt or electronic pad. The captured signature, along with other receipt information, is then sent to the processor as an electronic file. Other examples also are possible, some or which are more fully described in co-pending, commonly assigned U.S. patent application Ser. No. 10/215,876, entitled, "INTEGRATED DISPUTE SYSTEM" filed on Aug. 8, 2002, by D. Pagliari, et al., the entire disclosure of which is herein incorporated by reference in its entirety.

In any case, upon request by the consumer, the processor transmits an electronic file comprising the receipt image to the consumer. In some embodiments, items on the receipt also may appear to the consumer as hyperlinks that allow the consumer to drill down even further into receipt-related information. The processor may provide this information by, for example, using a product's SKU or UPC identifier to consult a database having item information. This information then may be sent to the consumer.

In other embodiments, the consumer may request a categorized list of items purchased during a specified period of time. In such embodiments, the processor may use the SKU and/or UPC identifier to obtain information about the items from a number of receipts and categorize the items as requested by the user. The categories may be predefined or may be defined by the user. Other examples are possible, as is apparent to those having skill in the art in light of this disclosure. Thus, the present invention provides systems and methods for presenting purchase information to consumers.

Figure 1:
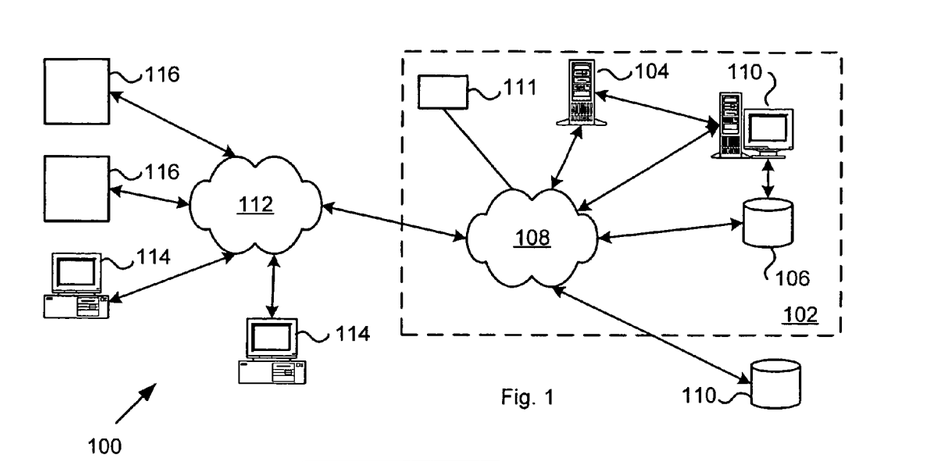
FIG. 1 illustrates a system for presenting receipt information to customers according to embodiments of the present invention.

FIG. 1 illustrates one example of a system 100 for presenting purchase information to consumers according to embodiments of the present invention. It is to be understood that the system 100 is presented for illustrative purposes only and many other embodiments and equivalents are apparent to those skilled in the art in light of the disclosure herein. The system 100 includes a host computer system 102. The host computer system 102 includes a server 104 and a database 106 associated with the server 104. The server 104 may be any of a wide variety of well-known computing devices, including, for example, a personal computer, a workstation, a mainframe, a server, and the like. The database 106 may be any of a wide variety of storage devices, including, for example, magnetic storage systems, such as tape or disk, optical storage systems, such as CD or DVD systems, and solid state systems, such as RAM or ROM, and the like. The server 104 may be electrically connected for communication directly to the database 106. Alternatively or additionally, the server 104 and database 106 may communicate via a network 108. The network 108 may be any of a wide variety of network configurations, such as, for example, an intranet or a portion of the Internet. The network 108 may be, for example, a local area network (LAN), a wide area network (WAN), or the like. The host computer system 102 may also include a financial statement processing computer 110. The financial statement processing computer 110 may be any of a wide variety of well known computing devices. It may be connected to the server 104 directly or via the network 108. Many additional computing and data collection platforms (not shown) may be connected with the host computer system and/or be comprised by portions of it. For example, computers and databases may collect and store transaction information relating to activity for which financial statements are produced. Additionally, the host computer system may include an image capture device 111 configured to scan paper receipts into electronic files.

FIG. 1 also illustrates an external network 112 connected with the host computer system 102. The external network 112 may be, for example, the Internet or other network environment. Through the external network 112, consumers are able to connect with the host computer system 102 using, for example, consumer computers 114. Additionally, point-of-sale devices 116 may communicate with the host computer system. The point-of-sale devices 116 may be any of a wide variety of transaction information capturing devices, such as, for example, those more fully described in co-pending, commonly assigned U.S. patent application Ser. No. 09/634,901, entitled, "POINT-OF-SALE PAYMENT TERMINAL" filed on Aug. 9, 2000 by Templeton, et al., which application is entirely incorporated herein by reference.

The system also may include a product information database 118. The product information database stores information on products according to SKU, UPC, and/or other like identifiers. In some embodiments, the product information database is comprised by the host computer system 102.

Having described an exemplary configuration of the system 100, the general operation of the system 100 will be described. More specific operation of the system will be described hereinafter with reference to the remaining figures. Financial transaction information is collected and stored using computers and storage devices associated with the host computer system 102. The financial transaction information may include, for example, images of actual credit card receipts. The receipts may be sent to the host computer system 102 from a point-of-sale device 116 and/or may be scanned into an electronic image file by an image capture device 111 in ways more fully described elsewhere herein. The electronic images are stored at, for example, the database 106.

Periodically, the financial transaction information is processed into financial statements for each consumer by the financial statement processing computer 110. The statements may be presented to consumers either electronically (as more fully described in previously-incorporated U.S. patent application Ser. No. 10/180,251) or physically (as more fully described in co-pending, commonly assigned U.S. patent application Ser. No. 10/045,589, entitled, "SYSTEM AND METHODS OF PROVIDING INSERTS INTO ENVELOPES" field on Nov. 8, 2001, by B. Bennett, et al., the entire disclosure of which is herein incorporated herein incorporated by reference). According to the present invention, consumers may request to view their statements electronically from their consumer computer 114. The host computer system 102 receives the request and sends the statement. If a consumer desires more detailed information about a particular charge, the consumer may, for example, select a hyperlink on the statement. In response to receiving this request for additional information, the host computer system 102 may obtain the image of the receipt relating to the charge from the database 106 and send it to the consumer computer 114.

In some embodiments, the consumer may also request additional information about a particular item on the receipt. In such cases, the consumer may, for example, select a hyperlink relating to the item, thereby transmitting a request to the host computer system 102 for more information on the item. In response, the host computer system may use an identifier relating to the item to obtain additional information on the item from the product information database 118. The host computer system then may transmit this information for display at the consumer computer.

In some embodiments, the consumer may request to receive a categorized list of items purchased. The list may comprise items purchased within a particular time period, from one or more particular merchants, and/or the like. The consumer may designate particular charges or statements for categorization. The host computer system 102 then uses identifiers associated with the selected items, statements, and/or receipts to obtain product information from the product information database 118. The host computer system 102 then categorizes the items and transmits the list to the consumer computer 114. In some embodiments, the consume may define the categories.

Figure 2:
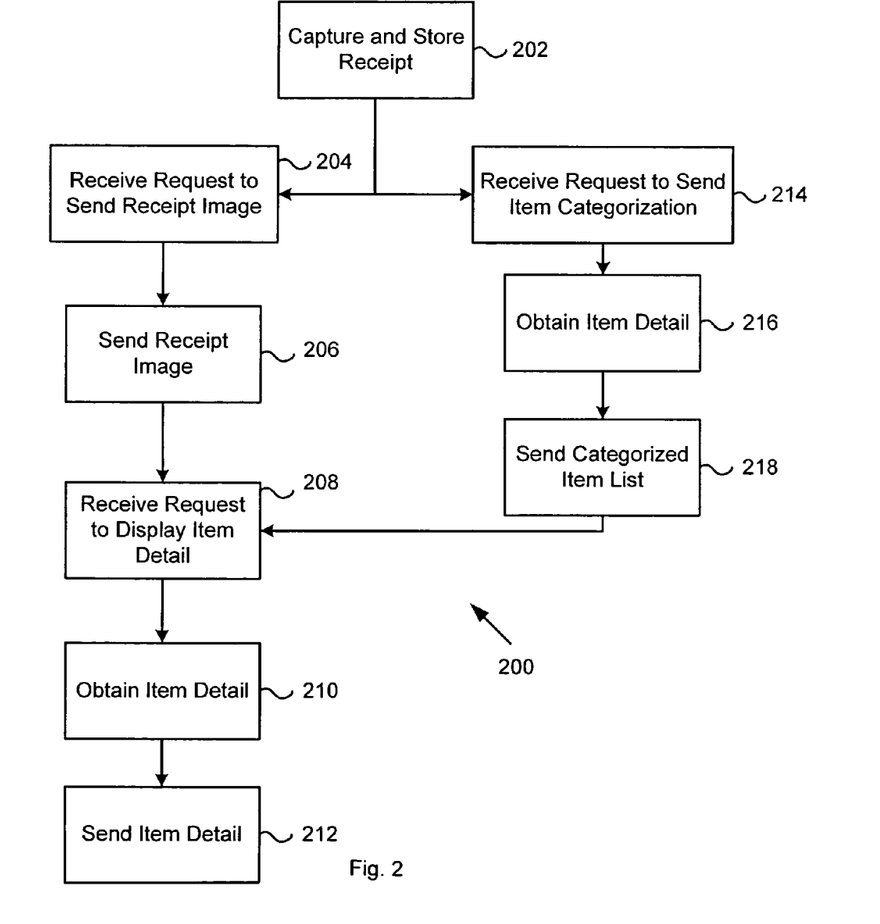
FIG. 2 illustrates a method of presenting receipt information to customers according to embodiments of the present invention, which may be implemented in the system of FIG. 1.

Having described the general configuration and operation of an exemplary system according to embodiments of the present invention, attention is directed to FIG. 2, which illustrates an exemplary method 200 according to embodiments of the present invention. The method begins at block 202, wherein a host computer system captures an image of a credit card receipt. The image may be captured in any of several ways. For example, a paper receipt may be scanned by the merchant using an image capture device, which may be a point-of-sale device. The image may comprise both the front and back of the receipt. Alternatively, receipts may be sent from the merchant to a processor, a third party, or other operator of the host computer system who then scans the receipts. In another example, the image may be scanned by a point-of-sale device and transmitted electronically to the host computer system. An image from a point-of-sale device may comprise a scan of a paper receipt or may comprise an electronically-captured signature together with items relating to a transaction. The captured images are stored at the host computer system.

At block 204, the host computer system receives a request from a consumer to view an image of a particular receipt. The host computer system locates the image and sends it at block 206. At block 208, the host computer system receives a request for more detailed information relating to a particular item on the receipt. In response, the host computer system consults a product information database or the like to obtain additional information relating to the item at block 210. The information may be obtained using the item's UPC, SKU, or other identifier. At block 212, the host computer system sends the item detail.

In some embodiments, the host computer system may receive a request to categorize a group of items at block 214. These items may be, for example, all items purchased from a particular merchant during a specified period of time. The items may comprise all items relating to a particular statement period. The items may comprise all items purchased within a particular price range. Many other such examples are possible. In response to the request, the host computer system obtains more detailed information relating to the items at block 216. The host computer system then categorizes the information according to the detailed information and send the list at block 218. The items may be categorized in the list according to predefined categories or may be categorized according to categories defined by the requester. Other examples are possible.

Figure 3A:
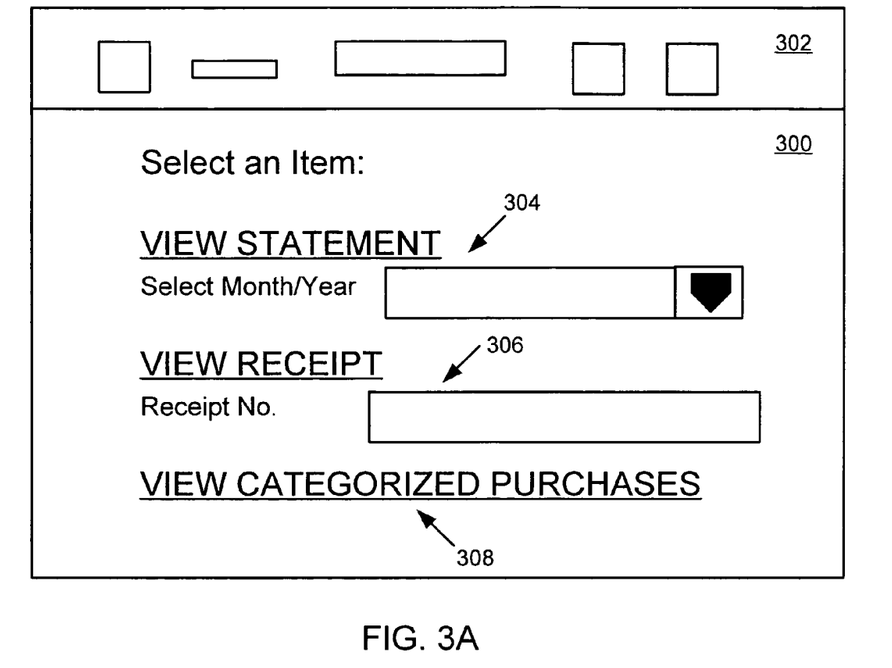
FIGS. 3A-3F illustrate a series of display screens that may be used to present purchase information to consumers according to embodiments of the invention.

Attention is now directed to FIGS. 3A-3F, which illustrate a series of display screens that a consumer may encounter while requesting and viewing purchasing information according to embodiments of the invention. The display screens of FIGS. 3A-F are exemplary; other examples are possible. The display screens may appear in a browser environment, as is know in the art. FIG. 3A illustrates a menu screen 300. The menu screen 300 may be access-controlled (e.g., consumers reach this screen only after identifying their account number and entering a password). The menu screen 300 includes a navigation bar 302 that includes buttons, data boxes, menus, and/or the like, for navigating through the display screens and performing other functions related to browser environments. The menu screen 300 includes a series of selections 304, 306, 308, for selecting functions according to embodiments of the invention. Selection 304 allows a consumer to view a credit card statement. The consumer may access this selection 304 by selecting a statement month and year from, for example, a drop down menu. In response, the statement screen 310 of FIG. 3B appears.

Figure 3B:
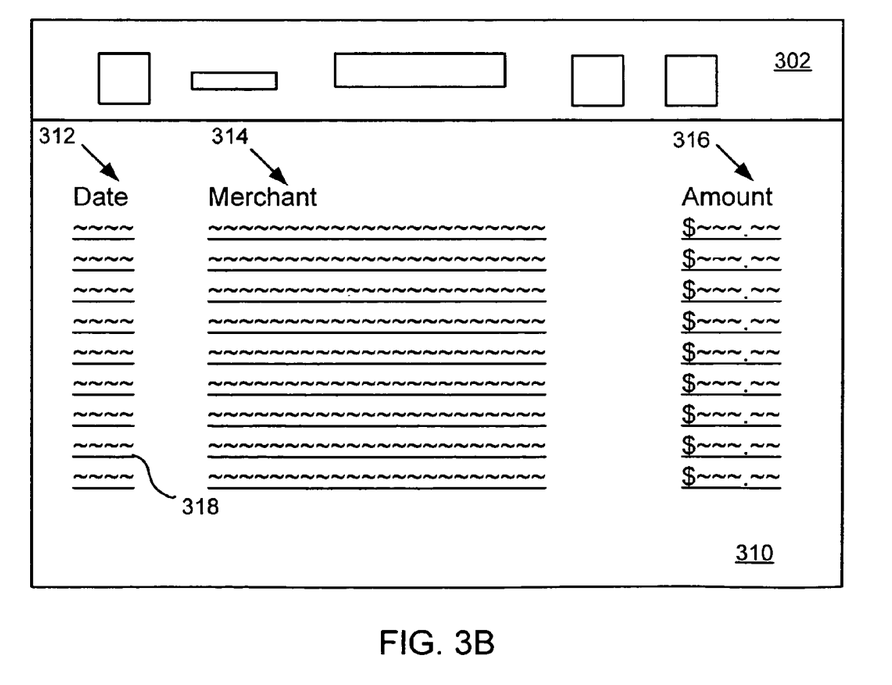

The statement screen 310 includes a listing of purchases that the consumer charged. Each entry in the list includes the date 312 of the change, the merchant 214 from whom the consumer purchased the goods or services, and the amount 316 of the charge. Individual items 318 in the list may serve as hyperlinks to more detailed information amount the related charge. Selecting an item 318 returns the receipt screen 320 of FIG. 3C.

Figure 3C:
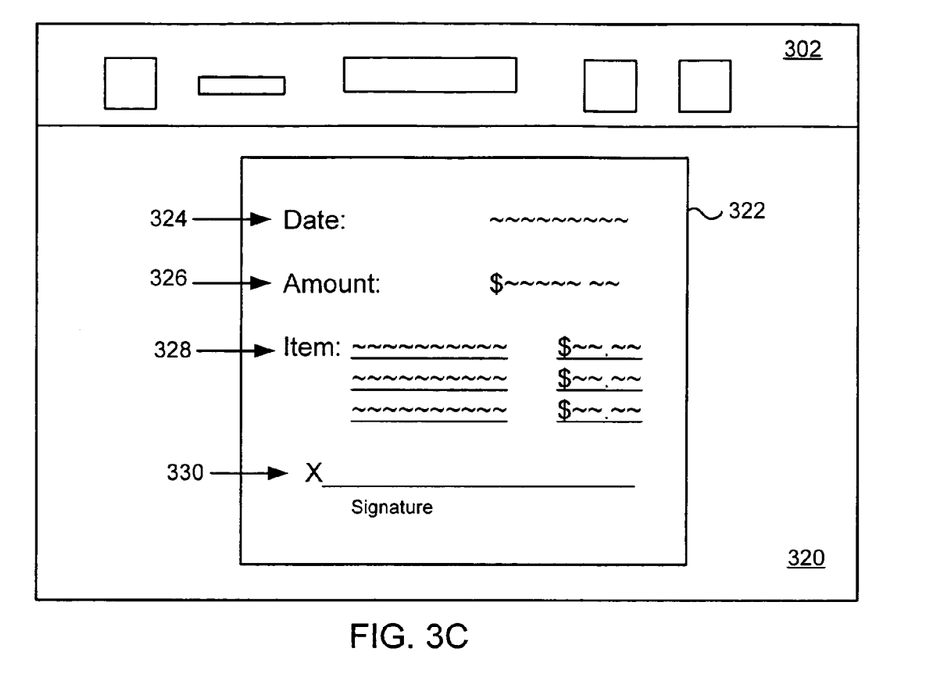

The receipt screen 320 displays an electronic image of the receipt 322 relating to a charge. The receipt may include the date of the charge 324, the amount of the charge 326, and a listing of the items charged 328. Additionally, the receipt 322 includes an image of the consumer's signature 330. The individual items 332 in the list of items charged 328 may serve as hyperlinks to more detailed product information about the items. In response to selecting one of the items charged 328 the product information display screen 360 of FIG. 3F may be returned, which will be described in more detail hereinafter.

Returning to FIG. 3A, the view receipt selection 306 returns the receipt screen 320 of FIG. 3C. The receipt 322 displayed in this case is of a receipt whose number the consumer enters in the view receipt selection 306.

Figure 3D:
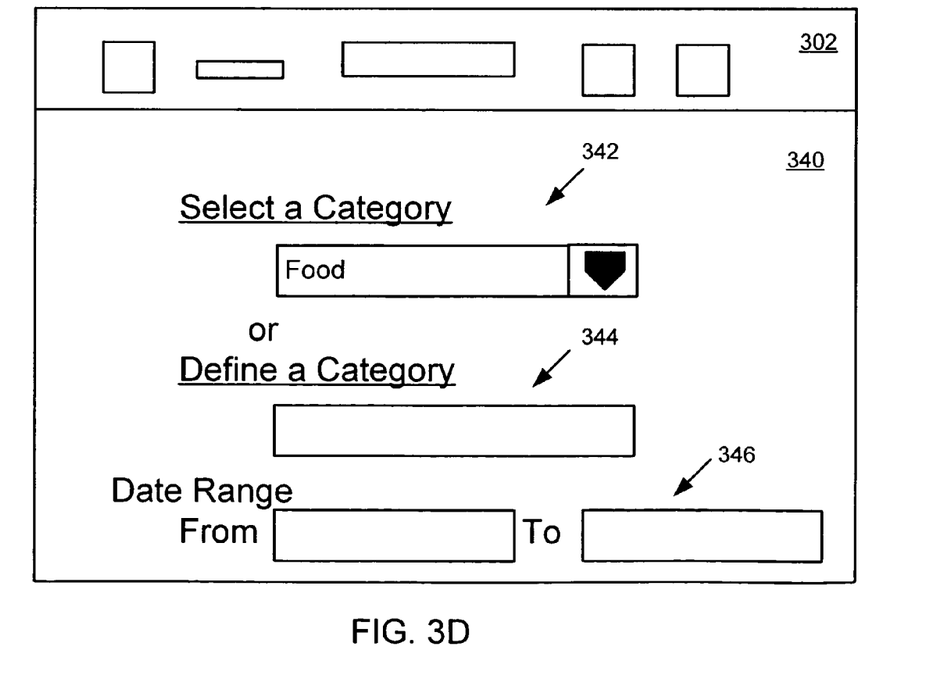

Selecting the view categorized purchases selection 308 of FIG. 3A returns the category selection screen 340 of FIG. 3D. The category selection screen includes a predefined category selection 342, a consumer-defined category selection 344 and a date range selection 346. Thus, the consumer may view categorized purchases by selecting predefined UPC/SKU categories or entering categories of his own choosing. Further, the consumer may limit purchases to only those made within a particular date range. Of course, other categorization methods are possible and apparent to those of skill in the art in light of this disclosure.

Figure 3E:
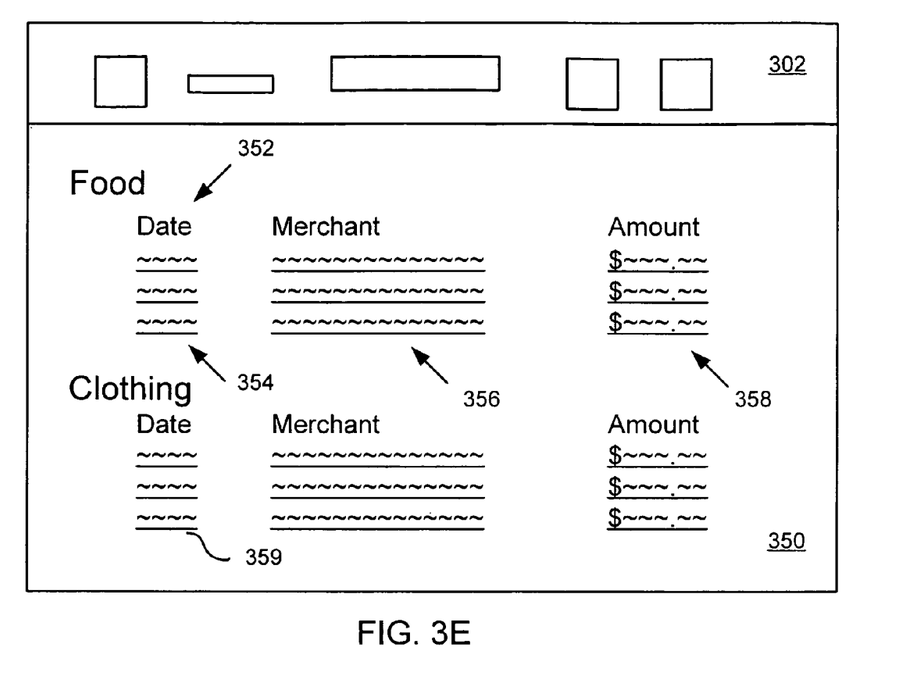

Having selected categories, the consumer is presented with a categorized purchases screen 350 of FIG. 3E. The screen 350 includes categories 352 and groups purchases made by the consumer under these categories. Each listing includes the date 354 of the purchase, the item 356 purchased, and the amount 358 paid for the item. As with the receipt screen 320 of FIG. 3C, individual items 359 may serve as hyperlinks to more detailed information about the item. Thus, selecting an item 359 returns the product information display screen 360 of FIG. 3F.

Figure 3F:
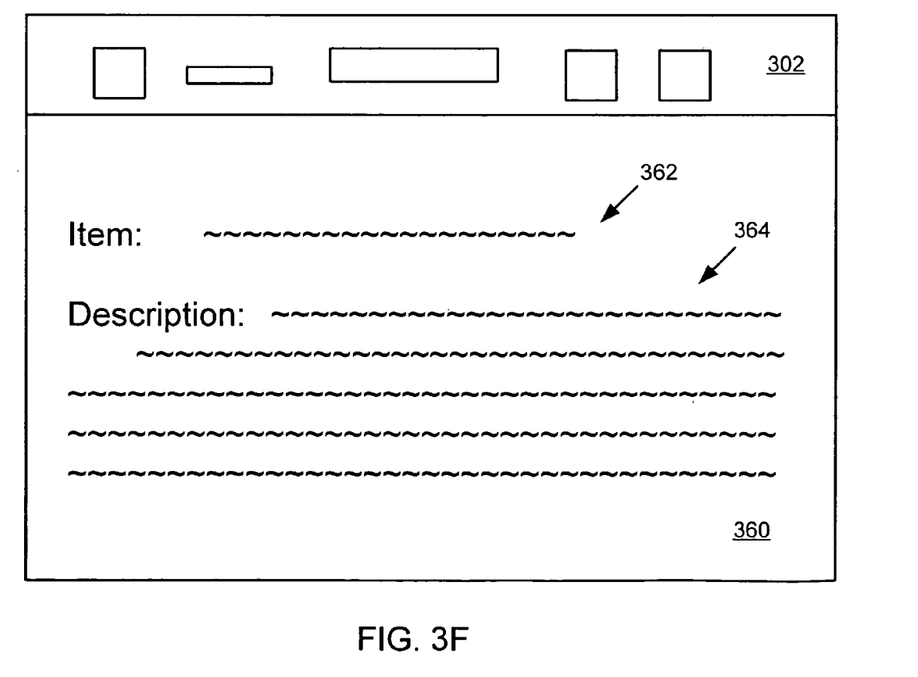

The product information screen 360 includes the name of the item 362 and a description of the item. The description may come from a database of product information as previously described herein. Many other examples of an interactive environment for displaying purchasing information are possible.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to presenting credit card receipts. For example, the present invention may be used to present receipts for other purchases, such as debit card purchases, stored value card purchases, and the like. Accordingly, the above description should not be taken as limiting the scope of the invention, which is defined in the following claims.

What is claimed is:

1. A method of presenting an image of a receipt to a consumer, comprising:
   electronically capturing a receipt;
   storing the receipt at a host computer system;
   receiving a request at the host computer system from a computer of the consumer to display the image of the receipt;
   transmitting an electronic file comprising the image of the receipt for display at the consumer computer, the electronic file further comprising programming that causes at least one purchase item included on the receipt to appear as a selectable link to obtain more detailed information about the item;
   receiving from the consumer computer information that defines at least one user-defined category based on product information;
   receiving a request at the host computer from the consumer computer to display a categorical listing of items purchased by the consumer, wherein the items are comprised by a plurality of receipts;
   for each of the plurality of receipts, consulting a database for product information relating to each item of the receipt;
   using the product information to sort the items into categories comprising the at least one user-defined category; and
   transmitting a second electronic file from the host computer system to the consumer computer, wherein the file comprises a listing of the items sorted into categories comprising the at least one user-defined category based on product information for display at the consumer computer.

2. The method of claim 1, wherein the receipt comprises a credit card receipt.

3. The method of claim 1, wherein the receipt comprises an image of the consumer's signature.

4. The method of claim 1, wherein the receipt is printed on paper at a point of sale and electronically capturing comprises scanning an image of the receipt to an electronic file.

5. The method of claim 1, wherein electronically capturing comprises receiving a file from a point-of-sale device, wherein the file comprises an image of the consumer's signature.

6. The method of claim 1, further comprising:
   receiving a selection of the purchase item from the consumer;
   consulting a database for information about the item; and
   transmitting a file comprising the information to the consumer.

7. The method of claim 1, wherein the second electronic file comprises programming that causes at least one item to appear as a selectable link to more detailed information about the item.

8. A system for presenting an image of a receipt to a consumer, comprising:
   a host computer system, including a product information database for storing product information that is retrievable via an identifier relating to an item; and
   an interface through which the host computer system communicates with at least one consumer computer;
   wherein the host computer system is programmed to:
      receive an electronically-captured receipt;
      store the receipt;

receive a request from a computer of the consumer to display the image of the receipt; and transmit an electronic file comprising the image of the receipt for display at the consumer computer.

9. The system of claim 8, wherein the receipt comprises a credit card receipt.

10. The system of claim 8, wherein the host computer system further comprises an image capture device configured to electronically capture receipt images.

11. The system of claim 10, wherein the image capture device is further configured to convert image information captured from a receipt into data, whereby the data may appear in an electronic image of the receipt as a selectable link relating to the data.

12. The system of claim 8, wherein the interface is configured to provide communication between the host computer system and at least one point-of-sale device.

13. The system of claim 8, wherein the identifier is selected from the group consisting of UPC and SKU.

14. A system for presenting an image of a receipt to a consumer, comprising:
means for receiving an electronic image of a receipt;
means for storing the image;
means for receiving a request from a computer relating to the consumer to display the image;
means for transmitting the image to the consumer computer;

means for obtaining product information relating to an item on the receipt; and
means for categorizing a plurality of items on a receipt into user-definable categories according to the product information.

15. A method of presenting receipt information to a consumer, comprising:
receiving from a consumer computer information that defines at least one user-defined category;
receiving a request at the host computer from the computer of the consumer to display a categorical listing of items purchased by the consumer, wherein the items are comprised by a plurality of receipts;
for each of the plurality of receipts, consulting a database for information relating to each item of the receipt;
using the information to sort the items into categories comprising the at least one user-defined category; and
transmitting an electronic file from the host computer system to the consumer computer, the electronic file comprising a list of the items sorted into categories comprising the at least one user-defined category for display at the consumer computer.

16. The method of claim 15, wherein the electronic file comprises programming that causes at least one item to appear as a selectable link to more detailed information about the item.

* * * * *